United States Patent
Hansen et al.

(10) Patent No.: US 12,399,708 B2
(45) Date of Patent: *Aug. 26, 2025

(54) SOFTWARE RECOGNITION USING TREE-STRUCTURED PATTERN MATCHING RULES FOR SOFTWARE ASSET MANAGEMENT

(71) Applicant: Flexera Software LLC, Itasca, IL (US)

(72) Inventors: Kenneth Aas Hansen, Hamar (NO); Rolf Georg Lunder, Lillehammer (NO); Lars Køhler, Hamar (NO); Peter Björkman, Trångsund (SE)

(73) Assignee: Flexera Software LLC, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,869

(22) Filed: May 14, 2024

(65) Prior Publication Data
US 2024/0303073 A1    Sep. 12, 2024

Related U.S. Application Data

(63) Continuation of application No. 17/415,615, filed as application No. PCT/SE2018/051326 on Dec. 17, 2018, now Pat. No. 12,014,169.

(51) Int. Cl.
  *G06F 8/70*    (2018.01)
  *G06F 21/10*    (2013.01)
  *G06Q 10/087*    (2023.01)

(52) U.S. Cl.
  CPC .............. *G06F 8/70* (2013.01); *G06F 21/105* (2013.01); *G06Q 10/087* (2013.01); *G06F 21/1073* (2023.08)

(58) Field of Classification Search
  CPC ...... G06F 8/70; G06F 21/105; G06F 21/1073; G06Q 10/087
  See application file for complete search history.

(56) References Cited

U.S. PATENT DOCUMENTS

| | | | |
|---|---|---|---|
| 9,250,891 B1* | 2/2016 | Beranek | G06F 9/45558 |
| 10,740,399 B1* | 8/2020 | Eksombatchai | G06F 16/24578 |
| 2007/0130127 A1* | 6/2007 | Passmore | G06F 21/10 |
| 2007/0222674 A1* | 9/2007 | Tan | G01S 19/49 |
| | | | 342/357.32 |

(Continued)

FOREIGN PATENT DOCUMENTS

| | | | | |
|---|---|---|---|---|
| CN | 101485129 A | * | 7/2009 | ........... G06F 21/105 |
| CN | 106411997 A | * | 2/2017 | |
| WO | WO-2014145610 A1 | * | 9/2014 | ......... G06F 16/2428 |

OTHER PUBLICATIONS

Extended Search Report; European Application No. 18943600.9; Jun. 27, 2022.

(Continued)

*Primary Examiner* — Daxin Wu
(74) *Attorney, Agent, or Firm* — BARNES & THORNBURG LLP

(57) ABSTRACT

A method of software identification in a software asset management system is provided. The method comprises receiving software inventory data from a user terminal and processing the software inventory data, wherein processing the software inventory data comprise identifying software information based on the software inventory data. Thereby the software characteristics are identified.

20 Claims, 3 Drawing Sheets

(56) References Cited

U.S. PATENT DOCUMENTS

| | | | | |
|---|---|---|---|---|
| 2012/0304248 A1* | 11/2012 | Watts | ............... | G06Q 30/06 |
| | | | | 726/1 |
| 2013/0074189 A1* | 3/2013 | Boudreau | ............ | G06F 21/105 |
| | | | | 709/224 |
| 2015/0363691 A1* | 12/2015 | Gocek | ............... | G06N 3/02 |
| | | | | 706/16 |
| 2016/0026968 A1* | 1/2016 | Fan | ............... | G06Q 10/087 |
| | | | | 707/769 |
| 2016/0188145 A1* | 6/2016 | Vida | ............... | B60K 35/10 |
| | | | | 715/745 |
| 2017/0099604 A1* | 4/2017 | Raleigh | ............... | H04W 12/12 |
| 2017/0193218 A1* | 7/2017 | Shin | ............... | G06F 21/556 |
| 2018/0034856 A1* | 2/2018 | Mallya | ............... | H04L 63/105 |
| 2018/0225630 A1* | 8/2018 | Creager | ............... | G06Q 10/10 |
| 2018/0288190 A1* | 10/2018 | Lyons | ............... | G06F 11/3452 |
| 2019/0121883 A1* | 4/2019 | Swaminathan | ...... | G06F 16/2365 |

OTHER PUBLICATIONS

Examination Report for related European Patent Application 18943600.9, issued on Jun. 25, 2024, 5 pages.

* cited by examiner

SOFTWARE RECOGNITION USING TREE-STRUCTURED PATTERN MATCHING RULES FOR SOFTWARE ASSET MANAGEMENT

CROSS-REFERENCE TO RELATED APPLICATIONS

The present patent is a continuation of U.S. patent application Ser. No. 17/415,615, titled SOFTWARE RECOGNITION USING TREE-STRUCTURED PATTERN MATCHING RULES FOR SOFTWARE ASSET MANAGEMENT, filed 17 Jun. 2021, which is a National Phase of International Application PCT/SE2018/051326, titled SOFTWARE RECOGNITION USING TREE-STRUCTURED PATTERN MATCHING RULES FOR SOFTWARE ASSET MANAGEMENT, filed 17 Dec. 2018. The entire content of each aforementioned patent filing is hereby incorporated by reference.

TECHNICAL FIELD

The present disclosure generally relates to the field of software asset management and more particularly to a system configured to receive software inventory data from a user terminal and process the software inventory data to identify software information based on the software inventory data and associated use.

BACKGROUND ART

Personal computers, mobile devices, servers and comparable systems have various software installed thereon, often with different versions present at different times. Managing the software on one device demands an effort and numerous devices even more so. In addition, different devices may have different utilizations and thereby have a need for different sets of software.

Software is a valuable asset and an efficient management thereof is important for any individual or organization. Finding the compliance between software licenses and utilized software is one task when managing software assets.

The field of software asset management operates within that field. By utilizing software asset management applications, organizations can collect software inventory data from numerous managed devices. The collected software inventory data can then be mapped against the utility of the devices and to software licenses by such software asset management applications.

SUMMARY OF THE INVENTION

Personal computers, mobile devices, servers and comparable systems have seen an increase in complexity by an ever-increasing amount of software and variations thereof. In addition, the number of devices have increased, thus increasing the workload for software asset management. Thereby there is a demand for a more efficient software asset management that consumes fewer computing resources.

Since the software inventory data from various devices is collected in a raw format, identifying a software information demands an effort as well.

Currently, each instance of collected software inventory data is tested against a database of specific known kinds of software. If a software inventory data matches a known kinds of software in the database, the software inventory data is identified as the known kind of software from the database. If a software inventory data does not match a known kinds of software in the database, the test continues with the next post in the database. Thereby, in many cases, each instance of collected software inventory data is tested against the entire database until a match is found.

Since the current approach is to test all software inventory data against all known kind of software from the database, software asset management currently demands exponentially more computer power and thereby has problems with efficiency when scaling up.

An object of the present invention is to provide a system for software asset management which overcomes the problems stated above.

Aspects of the present invention are defined in the independent claims. Preferred embodiments are set forth in the dependent claims.

The invention is based on an insight that the database of specific known kinds of software can be structured by having a number of nodes in which split the database into a tree-like structure, thereby a correct match between a collected software inventory data and a known kind of software can be made by merely accessing a subset of the database. The structure contains a number of nodes that split the database into subsections based on different properties that need to be satisfied. To achieve this, the database of specific known kinds of software can be divided into subsections into which the different matching rules of the database can be grouped. By this, a specific instance of software inventory data merely has to be tested for a subsection of the database, thereby increasing the efficiency of identifying the software while demanding less time.

The term "rule" in this context means the conditions that the software inventory data needs to fulfil in order to be identified as a known software application.

According to one aspect of the invention, a method for software identification in a software asset management system comprising a processing unit, at a central unit, configured to identify software characteristics on software inventory data from a user terminal is provided. The method comprises receiving the software inventory data and processing the software inventory data. The software inventory data is received at the central unit from the user terminal. The processing of the software inventory data is performed at the central unit. Processing the software inventory data comprise identifying a software information based on the software inventory data, whereby the software characteristics are identified.

A software asset management system according to the present invention overcomes the problems stated previously and improves the software identification. Suitable applications for a system according to the present invention may be a situation where an improved method for software identification is requested.

By this, a method and a system for software identification in a software asset management system may be established.

The data communication link between the user terminal and the central unit may for an example utilize one or a plurality of different types of wired links or wireless links, such as for example xDSL, 2G, 3G, 4G, 5G TCP/IP, WiFi, Bluetooth, WiMax, WLL, PSTN, optical fibre or a combination thereof.

In one embodiment, identifying the software information based on the software inventory data may comprise testing the software inventory data against at least one rule.

In one embodiment, identifying the software information based on the software inventory data may comprise testing the software inventory data against a plurality of rules.

In one embodiment, testing the software inventory data may be performed against a subset of rules out of the plurality of rules, wherein the number of rules in the plurality of rules are more than the number of rules in the subset of rules.

In one embodiment, testing the software inventory data may be performed by identifying whether the software inventory data matches a subset of known kinds of software.

In one embodiment, testing the software inventory data may be performed against a second subset of rules out of the plurality of rules, wherein the number of rules in the plurality of rules are more than the number of rules in the second subset of rules.

In one embodiment, testing the software inventory data may be performed against a first subset of rules out the plurality of rules, and if the testing does not match a rule in the first subset of rules, testing of the software inventory data is performed against a second subset of rules out of the plurality of rules, wherein the second subset of rules is different from the first subset of rules. This may be an example of a behaviour for a non-excluding subset that may require a wider search. An example of this is the property application name. One rule might require a specific pattern for application name while another might accept anything. These non-exclusive subset divisions are more complex in that they might require backtracking and utilization of additional subsets.

In one embodiment, testing the software inventory data may be performed against a first subset of rules out of the plurality of rules, and if the testing does not match a rule in the first subset of rules, testing the software inventory data performed against a second subset of rules out of the plurality of rules, wherein the second subset of rules is different from the first subset of rules, and if the testing does not match a rule in the second subset of rules, testing the software inventory data performed against a third subset of rules out of the plurality of rules, wherein the third subset of rules is different from the first and the second subsets of rules.

In one embodiment, the plurality of rules may be divided into subsets of rules that are mutually exclusive. An example of mutually exclusive subsets is based on the property operating system (OS). A single rule will only match against one OS, thereby the plurality of rules may be divided into subsets based on the OS and only the subsets fulfilling that property needs to be utilized.

In one embodiment, the plurality of rules may be divided into a first subset of rules and a second subset of rules that are mutually exclusive.

In one embodiment, the plurality of rules may be divided into a first subset of rules and a second subset of rules, wherein one rule is comprised in the first subset of rules and the second subset of rules.

In one embodiment, the plurality of rules may be divided into a first subset of rules and a second subset of rules, wherein at least one rule is comprised in the first subset of rules and the second subset of rules.

In one embodiment, the plurality of rules may be divided into a first subset of rules and a second subset of rules, wherein a plurality of rules are comprised in the first subset of rules and the second subset of rules.

In one embodiment, testing the software inventory data may be performed against a subset out of the subset of rules, wherein the number of rules in the subset out of the subset of rules are less than the number of rules in the subset of rules.

In one embodiment, testing the software inventory data may be performed by identifying whether the software inventory data matches a subset out of the subset of known kinds of software. By this, a subset of known kinds of software may in turn be divided into one or more subsets, thereby further decreasing the amount of known software kinds that the software inventory data is matched against.

In one embodiment, testing the software inventory data may be performed against a sub-subset of rules, wherein the number of rules in the sub-subset of rules are less than the number of rules in the subset of rules.

The term "sub-subset" in this context means a subset out of a subset, namely that a subset is in turn be divided into one or more subsets. Another term for a sub-subset may be a second level subset. Accordingly, a third level subset means a subset out of a subset out of a subset. In a similar manner, a fourth level subset may be defined, etc.

In one embodiment, the plurality of rules in a subset may be divided into a first sub-subset of rules and a second sub-subset of rules that are mutually exclusive.

In one embodiment, the plurality of rules in a subset may be divided into a first sub-subset of rules and a second sub-subset of rules, wherein one rule is comprised in the first sub-subset of rules and the second sub-subset of rules.

In one embodiment, the plurality of rules in a subset may be divided into a first sub-subset of rules and a second sub-subset of rules, wherein at least one rule is comprised in the first sub-subset of rules and the second sub-subset of rules.

In one embodiment, the plurality of rules in a subset may be divided into a first sub-subset of rules and a second sub-subset of rules, wherein a plurality of rules are comprised in the first sub-subset of rules and the second sub-subset of rules.

In one embodiment, testing the software inventory data may not be performed against another subset of rules out of the plurality of rules, wherein the number of rules in the plurality of rules are more than the number of rules in the other subset of rules.

In one embodiment, testing the software inventory data may not be performed against a second subset of rules, wherein the second subset of rules are comprised in the plurality of rules, wherein the number of rules in the plurality of rules are more than the number of rules in the second subset of rules.

In one embodiment, testing the software inventory data may be performed against a first subset of rules before a second subset of rules, wherein the first subset of rules are comprised in the plurality of rules and the second subset of rules are comprised in the plurality of rules. The number of rules in the first and/or the second subset of rules are less than the number of rules in the plurality of rules.

In one embodiment, the method may further comprise normalizing the received software inventory data at the central unit. By normalizing the software inventory data, the speed of processing the inventory data may be increased.

In one embodiment, the method may further comprise normalizing the software inventory data at the user terminal. By normalizing the software inventory data, the speed of processing the inventory data may be increased.

In one embodiment, the method may further comprise generating a signature based on the received software inventory data at the central unit. By generating a signature, the speed of processing the inventory data may be increased.

In one embodiment, the method may further comprise generating a signature based on the received software inventory data at the user terminal. By generating a signature, the speed of processing the inventory data may be increased.

In one embodiment, normalising the software inventory data may comprise generating a signature based on the software inventory data.

In one embodiment, the software information may be identified based on a signature that is based on the software inventory data.

In one embodiment, normalising the software inventory data may comprise generating a plurality of hash digests each based on a different respective individual record of the software inventory data.

In one embodiment, the database of specific known kinds of software may be structured into subsets based on a signature that is based on the specific known kinds of software. The database of specific known kinds of software may comprise a signature that is based on each known kind of software. The software inventory data may be tested against a subset of the database that comprise a signature that is the same or similar as the signature based on the received software inventory data. By this, the received software inventory data merely has to be tested against a subset of rules that has the same or a similar signature.

In one embodiment, normalizing the software inventory data may comprise generating a signature based on the software inventory data may comprise truncation of at least a part of the software inventory data.

In one embodiment, normalizing the software inventory data may comprise generating a signature based on the software inventory data may comprise hashing of at least a part of the software inventory data.

In one embodiment, generating a signature based on the software inventory data may comprise truncating the software inventory data. By this, the signature will be a simplified version of the software inventory data. For example, each signature may be used as one subset of the database containing rules.

In one embodiment, generating a signature based on the software inventory data may comprise hashing at least a part of the software inventory data. By this, the signature will be a simplified version of the software inventory data. For example, each signature may be used as one subset of the database containing rules.

In one embodiment, generating a signature based on the software inventory data may comprise a combination of truncating and hashing at least a part of the software inventory data. By this, the signature will be a simplified version of the software inventory data. For example, each signature may be used as one subset of the database containing rules.

In one embodiment, generating a signature based on the software inventory data may comprise dividing the software inventory data, modifying the divided software inventory data and forming a normalized software inventory data. Dividing the software inventory data into parts may be performed for each one of the software inventory data. Modifying the divided software inventory data may be by truncating each part or by addition of predefined characters to each part so that each part has a standardized length. Forming a normalized software inventory data may be by joining the modified parts of the software inventory data.

In one embodiment, generating a signature based on the software inventory data may comprise dividing the software inventory data, modifying the divided software inventory data and forming a normalized software inventory data. Dividing the software inventory data into parts may be performed for each one of the software inventory data. Modifying the divided software inventory data may be by hashing. Forming a normalized software inventory data may be by joining the modified parts of the software inventory data.

In one embodiment, the length of the signature may be based on the complexity of the database.

In one embodiment, the length of the signature may be different in a first subset and a second subset of the database. By this, a more complex subset may be divided into more sub-subsets than a less complex subset, thereby reducing the number of rules to be checked while reducing unnecessary complexity in less complex subsets. For example a database may be divided into a plurality of first level subsets, wherein at least one first level subset may be divided into a plurality of second level subsets, wherein at least one second level subset may be divided into a plurality of third level subset, etc. This may be expanded to any level of subset where there is a demand for additional splits.

In one embodiment, the length of the signature may be short. By having a short signature, the plurality of rules are divided into a reduced number of subsets. This may for example be suitable for small databases in which processing time in each subset is limited.

The term "short" in this context means the length of the signature is decreased or limited, for an example to a length that is 1% to 5% of a software inventory data length. For example, a short standardized length may be that each part has a length of one symbol.

In one embodiment, the length of the signature may be long. By having a long signature, the plurality of rules are divided into an increased number of subsets. This may for example be suitable for bigger databases in which processing time in each subset is to be limited.

The term "long" in this context means the length of the signature is increased or having a limited reduction in length, for an example to a length that is 10% to 20% of a software inventory data length. For example a long standardized length may be that each part has a length of four symbols.

In one embodiment, testing the software inventory data may be performed against a plurality of second level subsets within a first out of at least two first level subset of rules out of the plurality of rules, and if the testing does not match a rule in the plurality of second level subsets of rules, testing the software inventory data performed against a second first level subset of rules out of the plurality of rules, wherein the second first level subset of rules is different from the first out of at least two first level subset of rules.

In one embodiment, normalising the received software inventory data may comprise dividing the software inventory data, modifying the divided software inventory data and forming a normalized software inventory data. Dividing the software inventory data into parts may be performed for each one of the software inventory data. Modifying the divided software inventory data may be by truncating each part or by addition of predefined characters to each part so that each part has a standardized length. Forming a normalized software inventory data may be by joining the modified parts of the software inventory data.

In one embodiment, identifying software information based on the software inventory data may be performed by pattern recognition. The pattern recognition may be performed by recognition of patterns and regularities in data, and may use a static of dynamic threshold for when a match has been found.

In one embodiment, identifying software information based on the software inventory data may be performed by pattern matching. The pattern matching may comprise a threshold for when a match is considered to be made. The threshold may be static or dynamic. The pattern matching may consider an entire data set, a subset of the data, segmented data or similar.

In one embodiment, identifying software information based on the software inventory data may be performed by text pattern matching.

According to one aspect of the invention a software asset management system comprising a processing unit, at a central unit, configured for software identification and to identify software characteristics on software inventory data from a user terminal is provided. The system is arranged to receive, at the central unit, the software inventory data from the user terminal. The system is further arranged to process, at the central unit, the software inventory data. Being arranged to process the software inventory data comprise being arranged to identify a software information based on the software inventory data. Thereby identifying the software characteristics.

According to one aspect of the invention a computer program for asset identification in a software asset management system is provided. The computer program comprises instructions which, when executed on at least one processor, cause the at least one processor to carry out the method according to any disclosed embodiments.

According to one aspect of the invention a computer-readable storage medium carrying a computer program for controlling a software asset management system according to disclosed embodiments is provided.

The processing unit may be adapted to carry out any method described in disclosed embodiments.

The system may be adapted to carry out any method described in disclosed embodiments.

BRIEF DESCRIPTION OF THE DRAWINGS

The invention is described in the following illustrative and non-limiting detailed description of exemplary embodiments, with reference to the appended drawings, wherein.

All figures are schematic, not necessarily to scale, and generally only show parts that are necessary in order to elucidate the invention, wherein other parts may be omitted or merely suggested. Throughout the figures the same reference signs designate the same, or essentially the same features.

DETAILED DESCRIPTION

The present invention can be used to identify software in a software asset management system which overcome or at least mitigate the problems of the prior art and with an improved functionality in a more efficient construction that provides reliability benefits.

Figure 1:
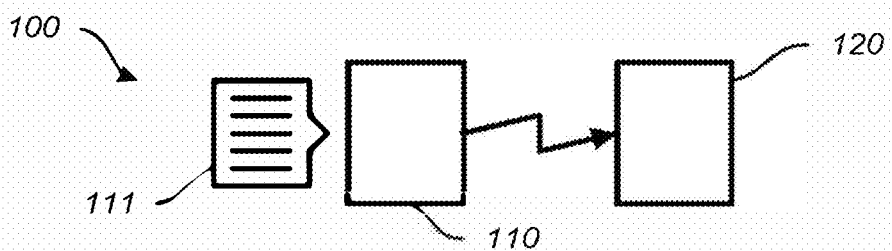
FIG. 1 is a schematic illustration of a system according to a first aspect of the present invention.

The invention is described in the following illustrative and non-limiting detailed description of exemplary embodiments, with reference to the appended drawings, wherein:

FIG. 1 shows a schematic illustration of a software asset management system 100 for software identification, according to an embodiment of the present invention. The system 100 comprises user terminal 110 and a central unit 120, both of which may be computers, terminals, handheld devices or similar having a processor and memory. The user terminal 110 is arranged to transmit software inventory data 111 via a data communication link. In some embodiments, an agent executing on the user terminal 110 may construct the inventory and transmit the inventory. The central unit 120 is arranged to receive the software inventory data and to process the software inventory data. The software inventory data is received from the user terminal 110 via the data communication link. The central unit 120 is further arranged to identify a software information based on the software inventory data that is received from the user terminal 110, thereby identifying the software characteristics. The data communication link between the different parts of the system 100, namely the user terminal 110 and the central unit 120 may for an example utilize one or a plurality of different types of wired links or wireless links, such as for example xDSL, 2G, 3G, 4G, SG TCP/IP, WiFi, Bluetooth, WiMax, WLL, PSTN, optical fibre or a combination thereof. A single terminal 110 is show by way of example, but commercial implementations are expected to include substantially more, e.g., more than 100, more than 1,000, and in some cases more than 10,000, e.g., for each of more than 10, more than 100, or more than 1,000 different tenant entities (like enterprises) having a tenant account by which the central unit 120 is accessed. The central unit 120 may for example be a server, a computer, a distributed server, a software implemented server, a cloud server, or a combination thereof.

Software inventory data 111 may be generated periodically, responsive to some local event (like the installation of new software or a new version of software), or responsive to some remote event (like a command from the central unit 120). Software inventory data 111 may include a plurality of records, each record corresponding to a different software application installed on the user terminal 110. In many cases, the software inventory data 111 may include more than 10, more than 100, or more than 200 different records of different applications installed. In some cases, the software inventory data 111 may further include attributes of the user terminal 110, like operating system (OS) and OS version, processor model and amounts of memory. In some embodiments, the records in each instance of software inventory data 111 may each indicate a name of a respective software application, a maker of the respective software application, a version of the respective software application, and a path to an executable of the respective software application in a file system of the OS.

Figure 2:
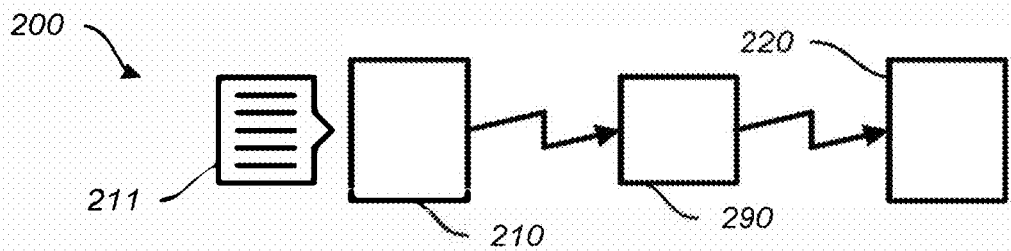
FIG. 2 is a schematic illustration of a system according to one embodiment of the invention.

FIG. 2 shows a schematic illustration of a software asset management system 200 for software identification, according to an embodiment of the present invention. The system 200 comprises user terminal 210, an intermediate unit 290 and a central unit 220. The user terminal 210 is arranged to transmit software inventory data 211 via a data communication link. The intermediate unit 290 is arranged to forward the software inventory data from the user terminal 210 to the central unit 220. The central unit 220 is arranged to receive the software inventory data and to process the software inventory data. The software inventory data is received from the user terminal 210 via the data communication link. The central unit 220 is further arranged to identify a software information based on the software inventory data that is received from the user terminal 210, thereby identifying the software characteristics. The data communication link between the different parts of the system, namely the user terminal, the intermediate unit and the central unit may for an example utilize one or a plurality of different types of wired links or wireless links, such as for example xDSL, 2G, 3G, 4G, 5G TCP/IP, WiFi, Bluetooth, WiMax, WLL, PSTN, optical fibre or a combination thereof.

The system may also comprise a database of specific known kinds of software. In some cases, the database is an in-memory data structure configured to afford relatively fast access and store data in a relatively space efficient manner relative to a relational database. In commercial embodiments, the database may store records of more than one-hundred thousand, more than one million, or more than ten million software applications and versions thereof. The database of specific known kinds of software may be structured into subsets based on a signature that may be based on the specific known kinds of software. The database of specific known kinds of software may also comprise a signature that is based on each known kind of software. The software inventory data may be tested against a subset of the database that comprise a signature that is the same or similar as the signature based on the received software inventory data. By this, the received software inventory data merely has to be tested against a subset of rules that has the same or a similar signature. The database of specific known kinds of software may be comprised in the central unit or at a database unit external to the central unit. An external database unit may be in communication with the central unit 220 via a data communication link. The data communication link between the database unit and the central unit may for an example utilize one or a plurality of different types of wired links or wireless links, such as for example xDSL, 2G, 3G, 4G, SG TCP/IP, WiFi, Bluetooth, WiMax, WLL, PSTN, optical fibre or a combination thereof.

Existing data structures for expediting access may not be suited for some use cases. Sorted lists with a binary search can often be too slow in worst-case scenarios, e.g., when searching for a record at the end of the list. Hash tables can often be too brittle, e.g., small changes in entries in a record for a software application can hash to different entries in the table. Prefix trees, like those used in Huffman coding, are generally unidirectional in tree traversals and, thus, may often not be expressive enough to accommodate searches that explore multiple candidate leaf nodes of a tree. That said, many, and in some cases, each of, these techniques may be used on conjunction with the approaches described herein.

In some embodiments, a Bloom filter, Cuckoo filter, or other probabilistic data structure may be pipelined with the data structure described elsewhere herein as an initial filter for software applications are not addressed in subsequent stages of the pipeline. In some embodiments, the filter may probabilistically indicate whether an entered record is within the downstream database, e.g., with false positive rate above or below some threshold, like 10%, 5%, or the like.

Figure 3A:
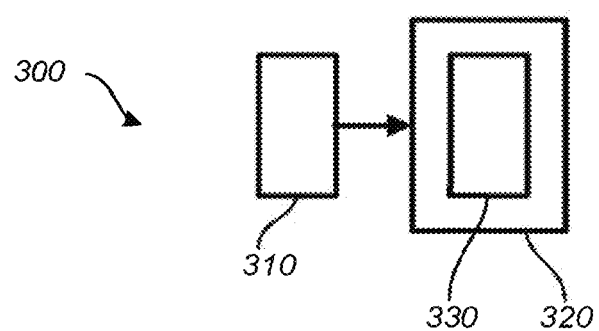
FIG. 3a is a schematic illustration of a method according to a second aspect of the present invention.

FIG. 3a shows a schematic illustration of a method 300 for software identification in a software asset management system according to an embodiment of the present invention. The system comprises a user terminal and a processing unit at a central unit. The method comprises receiving 310 software inventory data and processing 320 the software inventory data. The software inventory data is received at the central unit from the user terminal via a data communication link. At the central unit, the software inventory data is processed. Processing the software inventory data comprise identifying 330 software information based on the received software inventory data in order to identify software characteristics. The data communication link between the different parts of the system, namely the user terminal and the central unit may for an example utilize one or a plurality of different types of wired links or wireless links, such as for example xDSL, 2G, 3G, 4G, 5G TCP/IP, WiFi, Bluetooth, WiMax, WLL, PSTN, optical fibre or a combination thereof.

Identifying software information may be performed by testing the software inventory data in order to identify software characteristics. Testing the software inventory data may be performed against at least one rule or a plurality of rules.

Figure 3B:
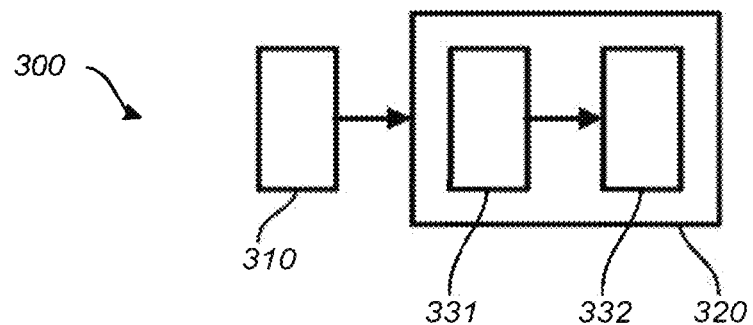
FIG. 3b is a schematic illustration of a method according to one embodiment of the invention.

FIG. 3b shows a schematic illustration of a method 300 for software identification in a software asset management system according to an embodiment of the present invention. The system comprises a user terminal and a processing unit at a central unit. The method comprises receiving 310 software inventory data and processing 320 the software inventory data. The software inventory data is received at the central unit from the user terminal via a data communication link. At the central unit, the software inventory data is processed by identifying software information and testing the software inventory data in order to identify software characteristics. Testing the software inventory data is performed against at plurality of rules. The testing is performed against a first subset of rules out of the plurality of rules 331, wherein the number of rules in the plurality of rules are more than the number of rules in the first subset of rules. If the software characteristics are identified from the first subset of rules, the testing is performed against a second subset of rules out of the plurality of rules 332, wherein the number of rules in the plurality of rules are more than the number of rules in the second subset of rules. The second subset of rules is different from the first subset of rules. The first subset of rules and the second subset of rules may be different by not having all rules in common or by not having any rules in common. The data communication link between the different parts of the system, namely the user terminal and the central unit may for an example utilize one or a plurality of different types of wired links or wireless links, such as for example xDSL, 2G, 3G, 4G, SG TCP/IP, WiFi, Bluetooth, WiMax, WLL, PSTN, optical fibre or a combination thereof.

Identifying software information may be performed by testing the software inventory data in order to identify software characteristics. Testing the software inventory data may be performed against at least one rule or a plurality of rules.

Testing the software inventory data may be performed against a first subset of rules out of the plurality of rules, and if the testing does not match a rule in the first subset of rules, testing the software inventory data performed against a second subset of rules out of the plurality of rules, wherein the second subset of rules is different from the first subset of rules, and if the testing does not match a rule in the second subset of rules, testing the software inventory data performed against a third subset of rules out of the plurality of rules, wherein the third subset of rules is different from the first and the second subsets of rules.

The plurality of rules may further be divided into subsets of rules that are mutually exclusive, such as on the property operating system. For example, the plurality of rules may be divided into a first subset of rules and a second subset of rules that are mutually exclusive. The plurality of rules may also be divided into a first subset of rules and a second subset of rules, wherein one or more rules are comprised in the first subset of rules and the second subset of rules.

Testing the software inventory data may be performed against a second level subset, that is a subset out of the subset of rules, wherein the number of rules in the second level subset are less than the number of rules in the subset of rules. Similarly, testing the software inventory data may be performed against a third, fourth, fifth or higher level subset, where each level subset comprise less rules in comparison with a corresponding lower level subset. Testing the software inventory data may also be performed on a first subset of rules before a second subset of rules, wherein the first subset of rules are comprised in the plurality of rules and the second subset of rules are comprised in the plurality of rules. The number of rules in the first and/or the second subset of rules are less than the number of rules in the plurality of rules.

Figure 4A:
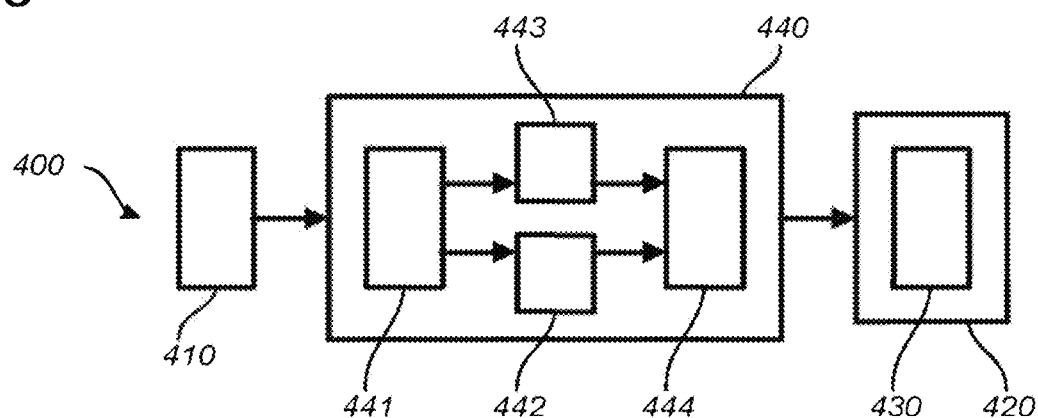
FIG. 4a is a schematic illustration of a method according to one embodiment of the invention.

Another alternative while testing the software inventory data, is not to perform a test against another subset of rules out of the plurality of rules. For example, if a specific operative system is identified, rules relating to other operating systems may not be tested. Not performing a test may also be performed for a second subset of rules, wherein the second subset of rules are comprised in the plurality of rules, wherein the number of rules in the plurality of rules are more than the number of rules in the second subset of rules. FIG. 4a shows a schematic illustration of a method 400 for software identification in a software asset management system according to an embodiment of the present invention. The system comprises a user terminal and a processing unit at a central unit. The method comprises receiving 410 software inventory data, normalizing 440 the software inventory data and processing 420 the software inventory data. The software inventory data is received at the central unit from the user terminal via a data communication link. Normalizing the software inventory data is performed by dividing 441 each one of the software inventory data into parts, modifying the divided software inventory data by truncating 442 each part or by addition 443 of predefined characters to each part so that each part has a standardized length and forming 444 a normalized software inventory data by joining the modified parts of the software inventory data. An example includes receiving a string encoding a name of a software application in a record in an inventory of software, parsing the first four tokens (e.g., words) from the string (or some other threshold number from the front or end or otherwise sampling, like the first two even numbered word positions), parsing the first two characters from each token (or some other threshold number from the front or end or otherwise sampling, like the first two even numbered character positions), and concatenating the parsed characters with delimiters into a short encoding of the string that effectuates a lossy compression that is resilient to variations outside of the sampled portions. Some embodiments may further normalize case. For example, the string "SoftCo Spreadsheets" might be compressed to "so-sp." At the central unit, the normalized software inventory data is processed. Processing the normalized software inventory data comprise identifying 430 software information based on the received and normalized software inventory data in order to identify software characteristics. The data communication link between the different parts of the system, namely the user terminal and the central unit may for an example utilize one or a plurality of different types of wired links or wireless links, such as for example xDSL, 2G, 3G, 4G, 5G TCP/IP, WiFi, Bluetooth, WiMax, WLL, PSTN, optical fibre or a combination thereof.

The method may also comprise generating a signature based on the received software inventory data. Generating the signature may for example be performed at the user terminal or at the central unit. Normalising the software inventory data may for example comprise generating a signature based on the software inventory data. The software information may be identified based on a signature that is based on the software inventory data.

Figure 4B:
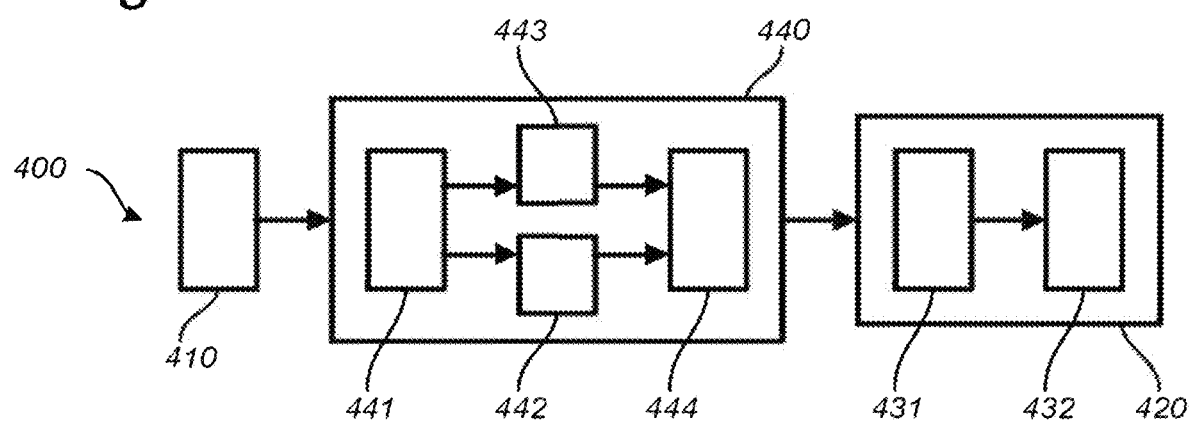
FIG. 4b is a schematic illustration of a method according to one embodiment of the invention.

FIG. 4b shows a schematic illustration of a method 400 for software identification in a software asset management system according to an embodiment of the present invention. The system comprises a user terminal and a processing unit at a central unit. The method comprises receiving 410 software inventory data, normalizing 440 the software inventory data and processing 420 the software inventory data. The software inventory data is received at the central unit from the user terminal via a data communication link. Normalizing the software inventory data is performed by dividing 441 each one of the software inventory data into parts, modifying the divided software inventory data by truncating 442 each part or by addition 443 of predefined characters to each part so that each part has a standardized length and forming 444 a normalized software inventory data by joining the modified parts of the software inventory data. At the central unit, the normalized software inventory data is processed by identifying software information and testing the normalized software inventory data in order to identify software characteristics. Testing the normalized software inventory data is performed against at plurality of rules. The testing is performed against a first subset of rules out of the plurality of rules 431, wherein the number of rules in the plurality of rules are more than the number of rules in the first subset of rules. If the software characteristics are identified from the first subset of rules, the testing is performed against a second subset of rules out of the plurality of rules 432, wherein the number of rules in the plurality of rules are more than the number of rules in the second subset of rules. The second subset of rules is different from the first subset of rules. The data communication link between the different parts of the system, namely the user terminal and the central u nit may for an example utilize one or a plurality of different types of wired links or wireless links, such as for example xDSL, 2G, 3G, 4G, 5G TCP/IP, WiFi, Bluetooth, WiMax, WLL, PSTN, optical fibre or a combination thereof.

The method may also comprise generating a signature based on the received software inventory data. Generating the signature may for example be performed at the user terminal or at the central unit. Normalising the software inventory data may for example comprise generating a signature based on the software inventory data. The software information may be identified based on a signature that is based on the software inventory data Normalizing the software inventory data and/or generating a signature based on the software inventory data may also comprise hashing and/or truncating at least a part of the software inventory data. Generating a signature based on the software inventory data may comprise dividing the software inventory data, modifying the divided software inventory data and forming a normalized software inventory data. Dividing the software inventory data into parts may be performed for each one of the software inventory data. Modifying the divided software inventory data may be by truncating each part or by addition of predefined characters to each part so that each part has a standardized length. Forming a normalized software inventory data may be by joining the modified parts of the software inventory data. Generating the signature based on the software inventory data may also comprise dividing the software inventory data, modifying the divided software inventory data and forming a normalized software inventory data. Dividing the software inventory data into parts may be performed for each one of the software inventory data. Modifying the divided software inventory data may be by hashing. Examples include cryptographic hashes, like SHA 256, MD5 and the like, and non-cryptographic hashes. Forming a normalized software inventory data may be by joining the modified parts of the software inventory data. The length of the generated signature may be based on the complexity of the database and may be different in a first subset and a second subset of the database. By this, a more complex subset may be divided into more sub-subsets than a less complex subset, thereby reducing the number of rules to be checked while reducing unnecessary complexity in less complex subsets.

Testing the software inventory data may also be performed against a plurality of second level subsets within a first out of at least two first level subset of rules out of the plurality of rules, and if the testing does not match a rule in the plurality of second level subsets of rules, testing the software inventory data performed against a second first level subset of rules out of the plurality of rules, wherein the second first level subset of rules is different from the first out of at least two first level subset of rules.

In some embodiments, the central unit may maintain a data structure that encodes the rules by which records and inventories of software are mapped to known instances of software applications. In some cases, the rules may be resilient to certain types of variations in the way the software applications are described in the inventory, such that two different records in two different inventories may be mapped to the same instance of a software application by the rules.

In some embodiments, the data structure may be characterized as a graph, like directed acyclic graph, like a tree. In some embodiments, the graph may include nodes that correspond to various states in a search for a known software application corresponding to a received record in an inventory. In some embodiments, the nodes may have one or more rules corresponding to different edges of the graph, and those edges may be directed edges that point to other nodes corresponding to other collections of rules or known software applications, for instance, with known software applications residing in leaf nodes of trees. In some embodiments, some of the edges have rules that match to, and only to, specific strings, while other edges have rules that express a pattern that matches to a plurality of different strings, for instance, those with wildcard characters in regular expressions. In some embodiments, the rules matched to the normalized version of records like those described above, in some cases with some rule specifying different subsets of a record in an inventory for software.

In some embodiments, a received record describing an instance of a software application on a user terminal may be matched to a known instance of a software application by traversing the graph. Some embodiments may execute a recursive depth first or breadth first traversal of the graph. At each node, some embodiments may apply the rules of edges pointing away from that node in a specified order, for example, applying mutually exclusive rules first and then rules that matched to collections of strings. The traversal may proceed to visit nodes for which the rules of the edge connecting to that node are satisfied (e.g., with a recursive call to a traversing function). In some embodiments, the graph may have a topology that sequences nodes having only mutually exclusive rules, or more mutually exclusive rules than other nodes, earlier in a traversal, for instance, at higher levels of a hierarchy in a tree, relative to nodes having more non-mutually exclusive rules, like those that pattern match to strings with wildcard characters. This structure is expected to afford relatively fast traversal to leaf nodes that identify software applications that are known as corresponding to a received record in an inventory, while rendering the data structure resilient to variation in the way a given software application of a given version is described on different user terminals.

It should be emphasized that a data structure need not be referred to as a graph (or more specific examples thereof, like a tree) in program code to constitute a graph or tree, as long as the relationships of a graph or tree are encoded by the data structure. In some embodiments, a graph or tree may be encoded in a relational database, as objects in object oriented database, as entries in a hierarchical data serialization format, as values in key-value pairs, and the like. In some embodiments, the graph may be encoded in a graph database having index free adjacency by which sets of relationships may be relatively quickly traversed and modified, examples including Neo4J and the like.

After matching records in the software inventory to known (e.g., canonical) identifiers of software, some embodiments may determine whether the identified instances of software are compliant with various constraints, like software licenses. Some embodiments may, for instance, determine a count of a number of installations of a known software in an organization having a plurality of the user terminals. Some embodiments may determine a difference between the count and a number of instances afforded by the license, in some cases determining whether the count exceeds the number of licensed instances. Some embodiments may generate a report and cause the report to be presented in a user interface, like on a remote user terminal (e.g., in a web browser) indicating license compliance for a plurality of different know instances of software according to a plurality of licenses for an organization. Some embodiments may further determine compliance based on attributes of user terminals, like whether license constrains on a number of processors, amount of memory, or number of user accounts on a given device are satisfied in various installations on user terminals.

FIGS. 1 to 4b show a simplified illustration of an embodiment of the central unit and its contents. The simplified illustration is intended to convey understanding of the general idea of storing different program functions in the system and lower-level details that are not necessary to understand the techniques are omitted. A memory segment within the central unit stores program code for controlling the central unit to perform operations described herein. In some embodiments, the central unit executes as a monolithic application on a single device (e.g., a server) or as a distributed application one a plurality of computing devices (like in a microservices architecture), in some cases with replicated instances of various components executing behind load balancers at the direction of orchestration tooling configured to elastically scale the number of instances according to demand. Although the simplified illustration of FIGS. 2, 3a, 3b, 4a and 4b shows pseudo code, it is to be understood that the program code may be constituted by machine code or any level program code that can be executed or interpreted by the central unit and/or the first user terminal. The program code may when run on the central unit and/or the first user terminal and will cause the central unit and/or the first user terminal to perform a function such as a method described herein. The method may comprise an advanced mathematical processing of the data.

According to embodiments of the invention the program code is adapted to cause a processor means to perform signal processing functions and methods described in this document.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon V" and "X occurs upon V and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing V," in contrast to statements that might be improperly argued to imply sequence limitations, like "performing X on items, performing V on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

While specific embodiments have been described, the skilled person will understand that various modifications and alterations are conceivable within the scope as defined in the appended claims.

What is claimed:

1. A method for identifying a match between collected software inventory data and a known kind of software application by accessing a software records database, wherein the software records database includes software records corresponding to known kinds of software applications, the method comprising:
   receiving, by a computer system, the software inventory data from a computing device;
   generating a signature based on the received software inventory data;
   structuring a data structure of specific known kinds of software, wherein the data structure is configured for access and storage of known kinds of software in subsets based on signatures of specific known kinds of software, wherein the data structure may is a graph including nodes;
   testing, by the computer system, the software inventory data against a plurality of rules by traversing the graph, wherein each of the plurality of rules corresponds to a respective edge of a plurality of edges in the graph and each of the plurality of edges belongs to a subsection of the graph, wherein each of the plurality of rules evaluates a corresponding property of the software inventory data, and wherein the traversing the graph terminates at a node of the graph;

identifying, by the computer system, a software record associated with the node; and determining, by the computer system, whether the identified software record is compliant with one or more constraints, wherein the one or more constraints includes a maximum number of installations of the corresponding software application afforded to an entity by a license; and outputting an indication of whether the identified software record is compliant based on the determination, wherein each subsection of the graph corresponds to a subset of software records within the database, wherein each subsection is based on different required properties, wherein each subsection of the software records database correspond to different groupings of matching rules, and wherein the determining whether the identified software record is compliant with the one or more constraints includes both determining a quantity of computing devices, including the computing device, on which the software application is installed and comparing the quantity to the maximum number of installations, whereby the match between the collected software inventory data and the known kind of software is made by performing only subset access of the software records database and results of the comparison are generated and output by the computer system as an indication of the match.

2. The method of claim 1, wherein the one or more constraints comprise at least one selected from the following: a number of processors of the computing device and a number of user accounts on the computing device.

3. The method of claim 1, wherein a first hierarchical level of the graph comprises:

a first edge corresponding to a first rule; and a second edge corresponding to a second rule, wherein the first rule is mutually exclusive with the second rule, and wherein the software inventory data is tested, by the computer system, against at least one rule selected from the first rule and the second rule.

4. The method of claim 3, wherein a second hierarchical level of the graph comprises:

a third edge corresponding to a third rule, wherein the third rule comprises a test to determine whether the software inventory data matches a text string, and wherein the software inventory data is tested, by the computer system, against the third rule after being tested against the at least one rule selected from the first rule and the second rule.

5. The method of claim 1, wherein the graph is a tree.

6. The method of claim 1, further comprising normalizing, by the computer system, the software inventory data.

7. The method of claim 6, wherein the normalizing the software inventory data comprises:

modifying, by the computer system, the software inventory data such that each of a plurality of parts of the software inventory data has a standardized length; and forming, by the computer system, normalized software inventory data by joining the modified parts of the software inventory data.

8. The method of claim 6, wherein the normalizing the received software inventory data comprises generating a plurality of hash digests, each hash digest being based on a different respective individual record of the software inventory data.

9. The method of claim 1, wherein the traversing the graph further comprises traversing, by the computer system, a second node of the graph, the second node corresponding to a state in a search for a software application.

10. The method of claim 1, wherein the identifying the software record comprises textual pattern matching.

11. The method of claim 1, further comprising:

generating a dashboard comprising an indication of whether a quantity of installations of a software application exceeds a number of seats for the software application afforded to an entity by a software license, wherein the quantity of installations is based at least in part on the identifying the software record associated with the node.

12. The method of claim 1, further comprising generating, by the computer system, and causing display of a report comprising information regarding whether the identified software record is compliant with the one or more constraints.

13. The method of claim 1, wherein the one or more constraints comprise at least one selected from the following: a number of processors of the computing device and an amount of memory of the computing device.

14. The method of claim 1, further comprising filtering, by the computer system, the software inventory data through a probabilistic data structure.

15. The method of claim 1, wherein the software record is identified, by the computer system, from a database comprising more than one hundred thousand software records.

16. The method of claim 1, wherein the software inventory data comprises information that identifies at least one software application installed on the computing device.

17. The method of claim 1, wherein a total number of edges in the graph exceeds a total quantity of the edges corresponding to the plurality of rules.

18. The method of claim 1, wherein testing the software inventory data is performed against a first subset of rules represented by a first subset of edges in the graph, and if the testing does not match a rule in the first subset of rules, testing the software inventory data is performed against a second subset of rules represented by a second subset of edges in the graph, wherein the second subset of rules is different from the first subset of rules.

19. The method of claim 1, further comprising:

generating, by the computer system, a dashboard comprising an indication of whether the identified software record is compliant with one or more constraints.

20. A tangible, non-transitory, machine-readable medium storing instructions that when executed by one or more processors effectuate operations for identifying a match between collected software inventory data and a known kind of software application by accessing a software records database, wherein the software records database includes software records corresponding to known kinds of software applications, the operations comprising:

receiving the software inventory data from a computing device;

generating a signature based on the received software inventory data;

structuring a data structure of specific known kinds of software, wherein the data structure is configured for access and storage of known kinds of software in subsets based on signatures of specific known kinds of software, wherein the data structure may is a graph including nodes;

testing, by the computer system, the software inventory data against a plurality of rules by traversing the graph, wherein each of the plurality of rules corresponds to a respective edge of a plurality of edges in the graph and each of the plurality of edges belongs to a subsection of the graph, wherein each of the plurality of rules evaluates a corresponding property of the software inventory data, and wherein the traversing the graph terminates at a node of the graph;

identifying, by the computer system, a software record associated with the node; and determining, by the computer system, whether the identified software record is compliant with one or more constraints, wherein the one or more constraints includes a maximum number of installations of the corresponding software application afforded to an entity by a license; and outputting an indication of whether the identified software record is compliant based on the determination, wherein each subsection of the graph corresponds to a subset of software records within the database, wherein each subsection is based on different required properties, wherein each subsection of the software records database correspond to different groupings of matching rules, and wherein the determining whether the identified software record is compliant with the one or more constraints includes both determining a quantity of computing devices, including the computing device, on which the software application is installed and comparing the quantity to the maximum number of installations, whereby the match between the collected software inventory data and the known kind of software is made by performing only subset access of the software records database and results of the comparison are generated and output by the computer system as an indication of the match.

* * * * *